(12) United States Patent
Ganachaud et al.

(10) Patent No.: US 6,336,466 B1
(45) Date of Patent: Jan. 8, 2002

(54) SYSTEM FOR THE VENTING OF A LIQUID TANK

(75) Inventors: Patrick Ganachaud, Laval; Serge Percebois, Courbeveille, both of (FR)

(73) Assignee: Solvay (BE)

( * ) Notice: Subject to any disclaimer, the term of this patent is extended or adjusted under 35 U.S.C. 154(b) by 0 days.

(21) Appl. No.: 09/484,859

(22) Filed: Jan. 18, 2000

(30) Foreign Application Priority Data

Jan. 18, 1999 (BE) .......................................... 09900034

(51) Int. Cl.[7] .......................... F16K 24/04; F16K 17/36; B60K 15/035
(52) U.S. Cl. ............................. 137/43; 137/39; 137/202
(58) Field of Search ............................ 137/39, 43, 188, 137/197, 202

(56) References Cited

U.S. PATENT DOCUMENTS

| 3,687,335 A | * | 8/1972 | Hunter | 220/85 |
| 3,738,384 A | * | 6/1973 | Hall | 137/39 |
| 3,757,753 A | * | 9/1973 | Hunt | 123/136 |
| 5,247,958 A | | 9/1993 | Deparis et al. | |
| 5,392,804 A | | 2/1995 | Kondo et al. | |
| 5,413,137 A | * | 5/1995 | Gimby | 137/43 |
| 5,577,526 A | | 11/1996 | Kasuagi et al. | |
| 5,687,756 A | * | 11/1997 | VanNatta et al. | 137/202 |
| 5,687,778 A | * | 11/1997 | Harris | 137/43 |
| 5,755,252 A | | 5/1998 | Bergsma et al. | |

FOREIGN PATENT DOCUMENTS

| DE | 19705440 | | 9/1997 | |
| FR | 002669864 A | * | 6/1992 | 137/43 |
| GB | 2 269 375 | | 2/1994 | |

* cited by examiner

Primary Examiner—Michael Powell Buiz
Assistant Examiner—Ramesh Krishnamurthy
(74) Attorney, Agent, or Firm—Larson & Taylor, PLC

(57) ABSTRACT

System for the venting of a liquid tank, comprising a float valve, arranged in the tank, in communication with a pipe forming one end of a venting circuit, and a closed volume internal to the tank and provided with an emptying device, the closed volume functioning as a capacity intended for collecting any possible entrainments of liquid coming from the tank, the valve being located outside the volume of the capacity and being connected to the latter by means of the pipe of the venting circuit.

5 Claims, 6 Drawing Sheets

SYSTEM FOR THE VENTING OF A LIQUID TANK

BACKGROUND OF THE INVENTION

1. Field of the Invention

The present invention relates to a system for the venting of a liquid tank.

2. Description of the Related Art

The present invention relates to a system for the venting of a liquid tank.

Liquid tanks, when liable to be displaced together with the liquid which they contain, are usually equipped with a ventilation system ensuring environmental safety when the tank is subjected to various stresses: movements in all directions and of any amplitude, thermal stresses, pressure drops or excess pressures.

This requirement is applicable to fuel tanks, particularly when they are mounted on motor vehicles, and when it is essential to prevent liquid fuel from escaping and to control the pronounced changes in gas pressure and volume during filling and for the entire duration of storage in the tank.

Solutions for solving these problems have been developed, making use of safety valves which are submerged in the tank and the upper part of which passes through a wall of the latter. These valves usually open onto a pipe leading to a housing or canister containing a material capable of trapping the liquid vapours present in the gases coming from the tank. It is not uncommon, however, for systems of this type still to present difficulties because, due to the special circumstances occurring during use, such as sudden movements or excessive inclination of the vehicle, liquid coming from the tank may nevertheless pass through the barrier of the safety valve and be present in the pipe leading to the canister, even reach the latter and disturb the free passage of the vapours.

To remedy this accidental entrainment of liquid out of the tank, attempts have been made to retain the liquid, which would escape through the pipe leading to the canister, by inserting into this pipe a dead volume intended to act as a capacity for collecting the liquid and allowing the vapours to pass freely.

Moreover, when it is not possible for them to be integrated into the safety valve itself, safety devices ensuring the prevention of overfilling of the tank (an "ISR" device wherein ISR stands for the French "Intediction de Sur—Remplissage") and for the automatic closing of the latter in the event of overturning ("ROV" device or roll-over valve) also have to be mounted on the tank or in its immediate surroundings. Multiple pipelines then connect the valve, the ISR and ROV devices and the canister to one another. These pipelines and the numerous connections which they require are often the source of microleaks which are unacceptable in view of the EURO 2000 programme and aims for the drastic reduction of emissions. It is also not uncommon for these multiple pipelines to have low points and siphons, in which small quantities of liquid accumulate and form as many obstacles to the free passage of the gases.

It is known, from British patent application GB-A-2,269, 375, to use a capacity which has leaktight walls and is integrated within a fuel tank and in which a safety valve is housed (see FIG. 2). A calibrated orifice 14 made at the top of the capacity allows the liquid to enter in the event of excessive inclinations or excessively violent movements of the tank. A duckbill-shaped non-return valve 12 makes it possible to empty the capacity 11 when the level of the liquid has fallen.

In this system, however, there are still problems associated with the inopportune closing of the valve and with the increase in pressure in the tank which may disturb the smooth operation of the engine. Moreover, when liquid droplets of small size are entrained via the orifice 14, they may, because of their low weight, be entrained directly towards the venting line 7 by the gas stream, without falling into the capacity 11. Furthermore, the ISR and ROV devices must still be connected to the valve with the aid of lines external to the tank.

SUMMARY OF THE INVENTION

The object of the invention is to overcome the disadvantages of the known ventilation systems by providing a system which avoids a capacity being placed on the lines external to the tank, makes it possible to empty out the liquid retained in the capacity in the event of a fall in the liquid level in the tank, conforms to the most stringent environmental standards and does not bring about any excess pressure inside the tank.

For this purpose, the invention relates to a system for the venting of a liquid tank, comprising, on the one hand, a float valve arranged in the tank, in communication with a venting pipe, and, on the other hand, a closed volume internal to the tank and provided with an emptying device, the said volume acting as a capacity intended for collecting and retaining any possible entrainments of liquid coming from the tank, according to which this float valve is located outside the volume of the capacity and is connected to the latter by means of the pipe of the venting circuit.

Preferably, the venting pipe in communication with the valve forms one end of a venting circuit. There may be a single venting circuit or, on the contrary, a plurality of these. Even more preferably, this pipe forms the end of the single venting circuit.

The liquid tank is a closed containment, of various shapes, which is generally leaktight relative to the outside and which may be equipped with various internal accessories or accessories passing through the wall of the containment. The tank may contain any type of organic or inorganic liquid or any mixture of such liquids. In particular, it is a fuel tank for motor vehicles. All the types of fuel used by motor vehicles may be stored in the liquid tank, in particular petrol and gas oil.

The system for the venting of a liquid tank, which is the subject of the invention, is a device comprising a plurality of elements, the overall function of which is to make it possible to degas a tank during the filling of the latter and to ventilate it during the period of use and consumption of the liquid which it contains, whilst keeping its external surroundings protected from any leak or emanation of undesirable gases.

The venting system according to the invention comprises a float valve, that is to say a device making it possible to open the tank with the aid of a valve controlled by the displacement of a float driven by the liquid level present in the tank.

According to the invention, the float valve is arranged completely within the tank.

Alternatively, the float valve may also be arranged in the tank and have an upper part which passes through a wall of this tank. The passage of the upper part of the valve through the wall of the tank is carried out under leaktight conditions by means of any suitable technique which is well-known per se. As an example of a leaktightness technique which may be used, mention may be made in a non-limiting way of the welding of the upper part of the valve to the cut-out wall of the tank, leaktight clamping or the use of a gasket designed for the type of liquid contained.

In the venting system according to the invention, the valve upper part emerging from the wall of the tank is in communication with a pipe which forms one end of a venting circuit. In other words, the gases emerging from the tank or entering the latter circulate in this pipe which, on one side, is connected in a leaktight manner to the valve upper part opening onto the valve actuated by the float and, on the other side, communicates with a circuit terminating in the outside atmosphere.

According to the invention, the venting system also comprises a closed volume internal to the tank. The term "closed volume" is intended to designate a volume of any desired shape delimited by walls tight to liquids and to gases. This volume is arranged inside the tank and communicates with the valve by means of the venting pipe, one end of which is connected to the valve. The function of this volume is to form a capacity capable of connecting and retaining any possible entrainments of liquid coming from the tank which would have passed through the barrier of the valve.

The size of the volume of this capacity is selected to be sufficient to collect all the liquid entrainments capable of passing through the barrier of the valve under special circumstances, particularly when the tank is full or near its maximum filling level. This volume also depends on the dimensions of the valve, on its very design and on the diameter of the pipe connecting it to the latter.

According to the invention, the closed volume internal to the tank and functioning as a capacity of the venting system comprises an emptying device. The term "emptying device" is intended to designate a valve which is located at a low point of the capacity and which can open when a sufficient weight of liquid has been connected in this capacity and which communicates directly with the internal volume of the tank. The function of this emptying device is to recycle the liquid which has been entrained together with the gases emerging from the tank and to prevent the capacity from being filled beyond a predetermined maximum level which depends on the shape of this capacity and on the characteristics of the valve.

According to the invention, the float valve is located outside the volume of the capacity. It may equally be located in the immediate vicinity of the capacity or, on the contrary, be located in a region of the tank which is distant from the said capacity. In either event, however, the float valve is connected to the capacity by means of the venting pipe described above.

According to a first advantageous embodiment of the venting system according to the invention, the latter comprises an overfilling prevention device (abbreviated to "ISR"). The function of the ISR device is to fix the useful volume of the tank and, during the filling operation, to prevent a predetermined level of liquid in the tank from being exceeded.

The ISR device according to this embodiment may be selected from all the known devices for performing this function. The particular ISR device having a high-density ball which by gravity shuts off the gas outlet pipe of the capacity has given good results.

Preferably, the ISR device is housed in the upper part of the capacity, on the inside of the latter.

According to an advantageous embodiment of the venting system, the capacity emptying device consists of a diaphragm valve which closes a port located at a low point of the capacity. A diaphragm made of elastomeric material and in the shape of an overturned umbrella has given excellent results.

This diaphragm-type emptying device may also advantageously be combined with the particular embodiment of the ISR device housed in the upper part of the capacity described above.

According to a variant of the venting system according to the invention, the float valve surmounts a high-density ball device resting in a perforated well and having the function of causing the closing of the valve in the event of the tank being overturned. This device thus performs a function of closing the tank automatically as soon as the latter begins to be overturned (a function abbreviated to "ROV" or "roll-over valve").

Advantageously, this variant is associated with the particular venting system which comprises an ISR device housed in the upper part of the capacity, as described above.

Another variant to the particular embodiment of the venting system comprises incorporating a device performing the ROV function within the capacity, in a cage, the bottom of which is in the form of a perforated well in which rests a high-density ball which, when it is displaced, pushes upwards a valve capable of shutting off the outlet pipe. This valve may, for example, take the form of a plate carrying, at its centre, a protuberance which can cooperate with the inlet of the gas discharge pipe so as to effect leaktight closure when it is displaced upwards under the effect of the displacement of the ball and comes into contact with the inlet of this pipe.

This variant is suitable in the case of venting systems comprising an ISR device housed in the upper part of the capacity. In this case, the outlet pipe leads directly to the ISR device.

A second embodiment of the venting system according to the invention comprises placing an ISR device at a point on the venting pipe which connects the float valve to the capacity, upstream of the latter. The term "upstream" is intended to designate a location on the side from which the gases come when they escape from the tank. In this configuration, the ISR device is located in the gas pipe, between the valve and the capacity.

According to a variant of the venting system according to the invention, the emptying of the capacity takes place via the orifice of a second float valve which is mounted below the capacity and the float of which slides in a stem submerged in the tank and opens a valve formed by the cooperation of a needle integral with the float and of an orifice located in the bottom of the said capacity.

This variant is highly suitable for the venting systems of the second embodiment described in detail above, that is to say those which comprise an ISR device located at a point of the venting pipe connecting the float valve to the capacity.

In another embodiment of the venting system according to the invention, a device ensuring an ROV function may be arranged at a point on a pipe connecting the capacity to a canister, downstream of the said capacity. The term "downstream" is intended to mean, in accordance with the meaning of the term "upstream" defined above, a location on the side towards which the gases are directed when they escape from the tank.

In this embodiment, the device ensuring the ROV function participates in the same principle as that described above. It may comprise any system capable of ensuring an identical or equivalent function. In particular, it may comprise a high-density ball device resting in a perforated well, as described above with regard to the first embodiment.

In particular, this embodiment is highly compatible with the second embodiment described above. Even more particularly, this embodiment is advantageously compatible with the venting system comprising an ISR device located at a point on the venting pipe connecting the float valve to the capacity and in which the emptying of the capacity takes place via the orifice of a second float valve mounted below the latter, as described above.

As a variant, a device ensuring an ROV function may also be incorporated into the capacity, in the upper part of the latter. Preferably, the ROV function is ensured by a high-density ball device resting in a cage, the bottom of which is in the form of a perforated well, so that when the ball is displaced, it pushes upwards a valve capable of shutting off the gas outlet pipe leading to a canister.

In particular, this variant is highly compatible with the second embodiment described above. Even more particularly, this variant is advantageously compatible with the venting system comprising an ISR device located at a point on the venting pipe connecting the float valve to the capacity, and in which the emptying of the capacity takes place via the orifice of a second float valve mounted below the latter, as described above.

Another variant of the venting system according to the invention is to use two high-density ball devices, the first arranged below the main float valve and the second below the float valve which shuts off the bottom of the capacity. The term "main float valve" designates the first valve which the gases encounter when they escape from the tank.

In particular, this other variant is highly compatible with the second embodiment described above. Even more particularly, this other variant is advantageously compatible with the venting system comprising an ISR device located at a point on the venting pipe connecting the float valve to the capacity, and in which the emptying of the capacity takes place via the orifice of a second float valve mounted below the latter, as described above.

Preferably, the pipes terminating at or leaving the capacity are integral with the tank. They may be fastened to the tank by any known technique, such as snap-fitting, adhesive bonding, welding, etc. It is particularly preferable that they be welded to the tank or that they form an integral part of the walls of the latter, for example when they are formed at the same time as the tank, during the operations of manufacturing the latter.

Most preferably, these pipes are, furthermore, integral with the various specific members which they connect (valve, capacity, canister, and, if appropriate, ISR and/or ROV devices). The best results are obtained when they are welded to these members or else when they are manufactured so as to form one and the same complex object comprising the tank, the pipes and all the members.

The subject of the present invention is also the use of the venting system described above for venting a fuel tank in a motor vehicle.

DESCRIPTION OF THE PREFERRED EMBODIMENTS

Figure 1:
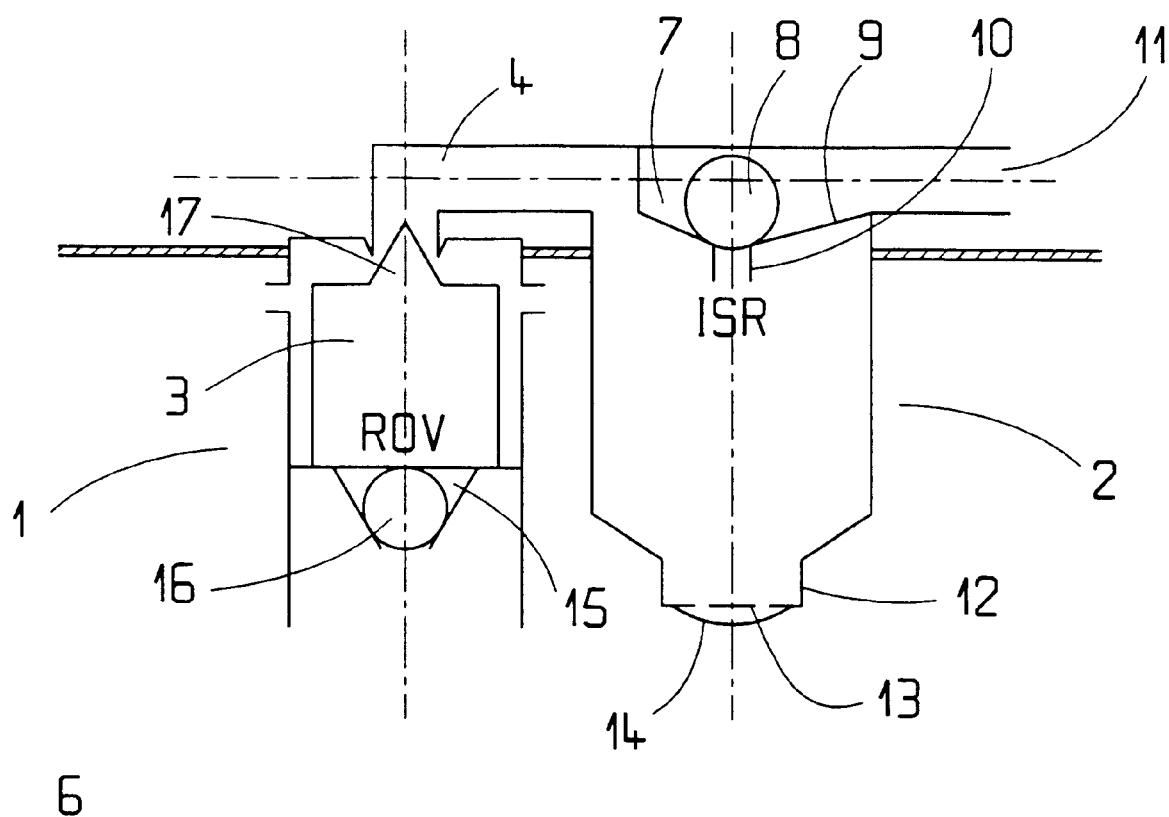
FIG. 1 is a diagrammatic elevational view, partially in cross section, of a first embodiment of the invention.
Figure 2:
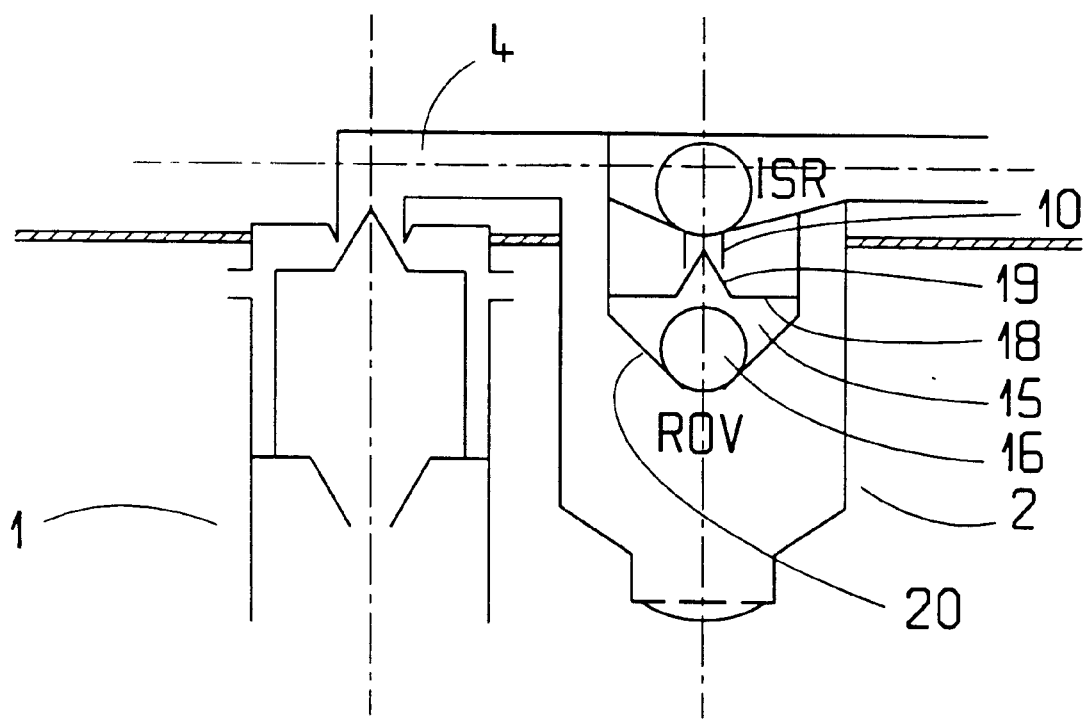
FIG. 2 is a diagrammatic elevational view, partially in cross section, of a modification of the embodiment of FIG. 1.
Figure 3:
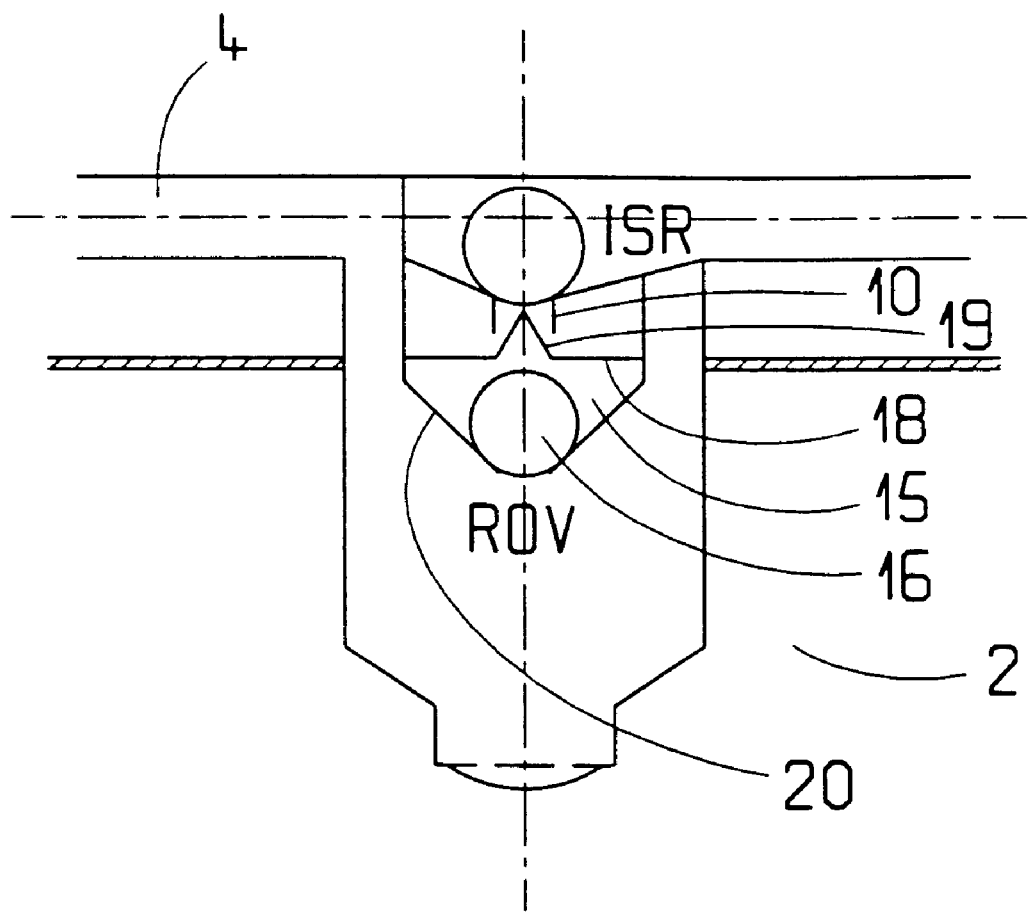
FIG. 3 is a diagrammatic elevational view, partially in cross section, of a further modification of the embodiment of FIG. 1.

FIGS. 1 to 3 illustrate venting systems according to the first embodiment explained above, in which the ISR device is housed in the upper part of the capacity.

FIG. 1 shows, more particularly, a venting system of a petrol tank 6 mounted on the vehicle, the said system comprising a float 3 of a float valve 1 and a capacity 2 arranged in the vicinity of the latter. The float 3 of the valve 1 supports a needle 17 which is integral with said float and shuts off the gas outlet when the petrol level becomes sufficiently high. A pipe 4, integral with a wall 5 of the tank 6 in which the valve 1 and the capacity 2 are immersed, connects the upper part of the valve 1 to that of the capacity 2. Housed in the upper part of the capacity 2 is an ISR device 7 having a high-density ball 8 resting by gravity on a frustoconical surface 9 and, at rest, shutting off the gas outlet pipe 10, the end 11 of which is connected to a canister (not illustrated). The lower part 12 of the capacity 2 is pierced with a port 13 shut off by a deformable diaphragm 14, in the form of an overturned umbrella, which functions as a non-return valve. A high-density ball ROV device resting in a perforated well 15 is arranged below the float 3 of the valve 1 and has the function of driving the float 3 of the valve 1 upwards when the tank 6 begins an overturning movement.

When the vehicle is in motion or when the tank is being filled, with the vehicle at a standstill, the gases coming from inside the tank 6 penetrate the valve 1 via ports (not illustrated) located in the upper part of the vertical walls of the latter, from where they escape via the pipe 4, the capacity 2 and the ISR device 7 towards the end 11 of the pipe leading to the canister. If, for example as a result of violent movement of the petrol in the tank during the filling operation or during a movement of the vehicle together with its tank filled to a high level near the permitted maximum, petrol were entrained together with the gases in the pipe 4, it would fall to the bottom of the capacity 2 and would remain retained in the latter, whereas the gases would continue their travel towards the outlet 11 and the canister. As soon as the vehicle is stopped and there is no pressure difference induced by the gas stream escaping from the tank, the petrol trapped in the capacity 2 opens the diaphragm 14 under the influence of its own weight, passes through the port 13 and returns to the tank 6. The diaphragm 13 is selected such that it is deformed and opens under the weight, in the capacity 2, of a given head of petrol below the total head of the volume available inside the capacity.

The venting system according to FIG. 1 makes it possible to perform a useful additional function, namely the ventilation of the tank in situations where there is a fall in the pressure of its internal atmosphere when the valve 1 is closed. This situation may become hazardous when there is simultaneous consumption and continuous extraction of a substantial quantity of fuel, and, in some cases, may cause the walls of the tank to implode. This situation may arise when the tank is filled to a level near its maximum level and the vehicle is climbing a high-degree gradient, thus causing the closing of the valve 1 as a result of the displacement of the float 3. In this situation, the diaphragm 14 opens under the influence of the pressure difference on either side of its walls, the said pressure difference being attributable to the pressure drop which is established in the tank and which thus makes it possible for air to enter via the capacity 2 connected to the pipe 11 leading to the canister and to the outside atmosphere.

FIGS. 2 and 3 illustrate venting systems which are comparable to that of FIG. 1 and in which the ROV device 15 and 16 has been incorporated in the capacity, below the ISR device. FIG. 2 shows a system where the valve 1 is located in the immediate vicinity of the capacity 2, whilst, in FIG. 3, the valve (not illustrated) is arranged at any other location in the tank. In both cases, the pipe 4 connects the valve to the capacity 2. In the ROV device 15 and 16, a plate 18 carries at its centre a protuberance 19 capable of cooperating with the orifice in the inlet pipe 10 of the ISR device in order to produce a valve tight to liquids and to gases. A ball 16 made of high-density material rests in a perforated well 20 and drives the plate 18 upwards when the tank 6 begins to overturn.

Figure 4:
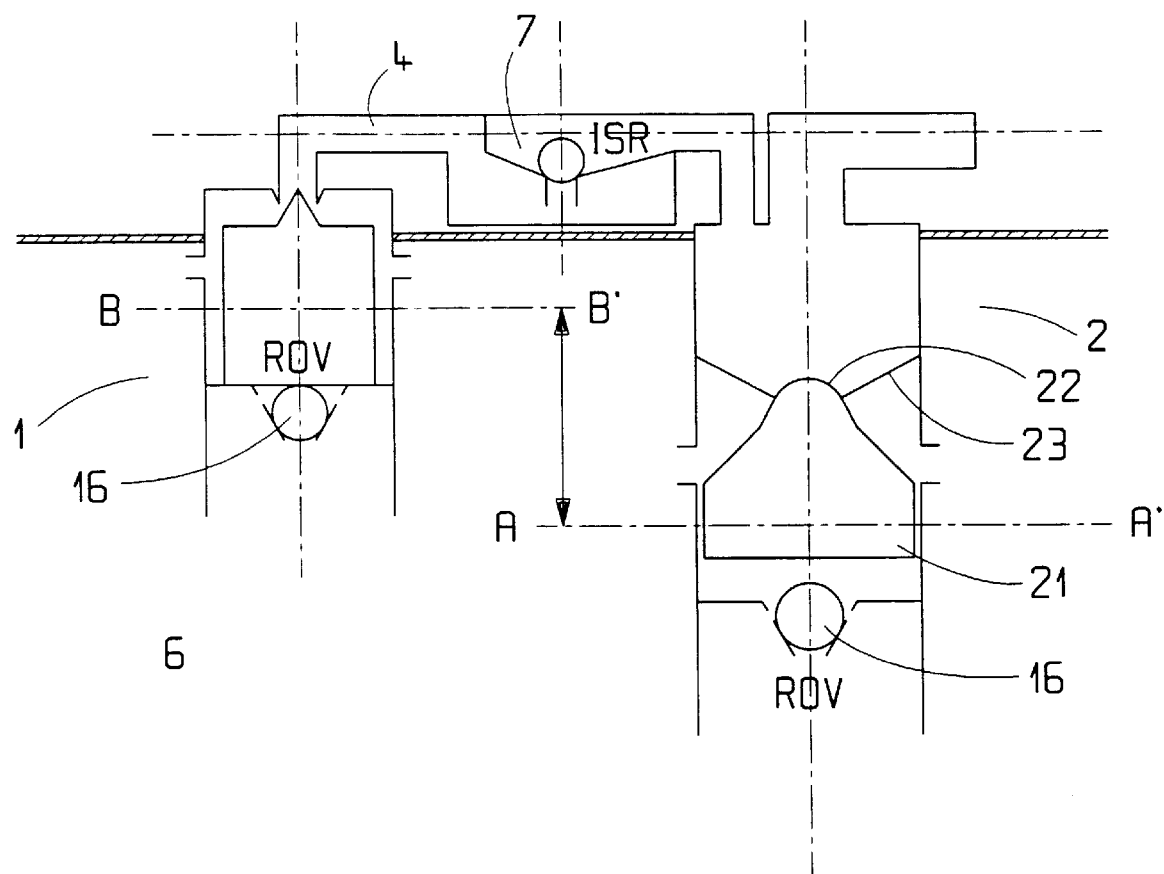
FIG. 4 is a diagrammatic elevational view, partially in cross section, of a second embodiment of the invention.
Figure 5:
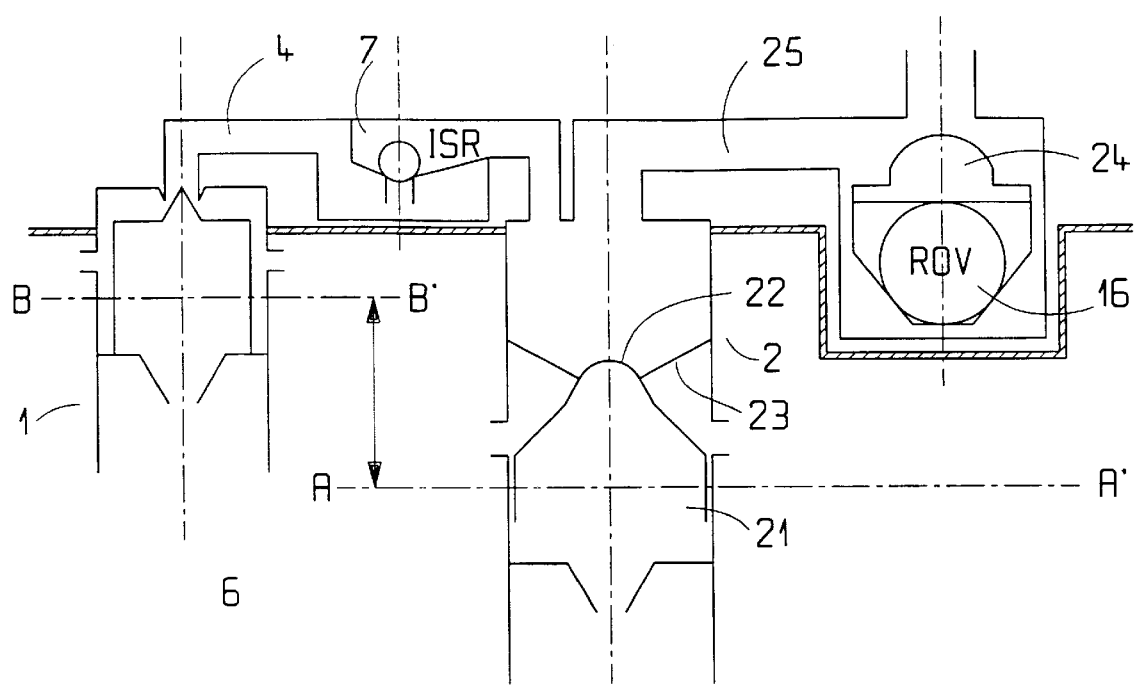
FIG. 5 is a diagrammatic elevational view, partially in cross section, of a modification of the embodiment of FIG. 4.
Figure 6:
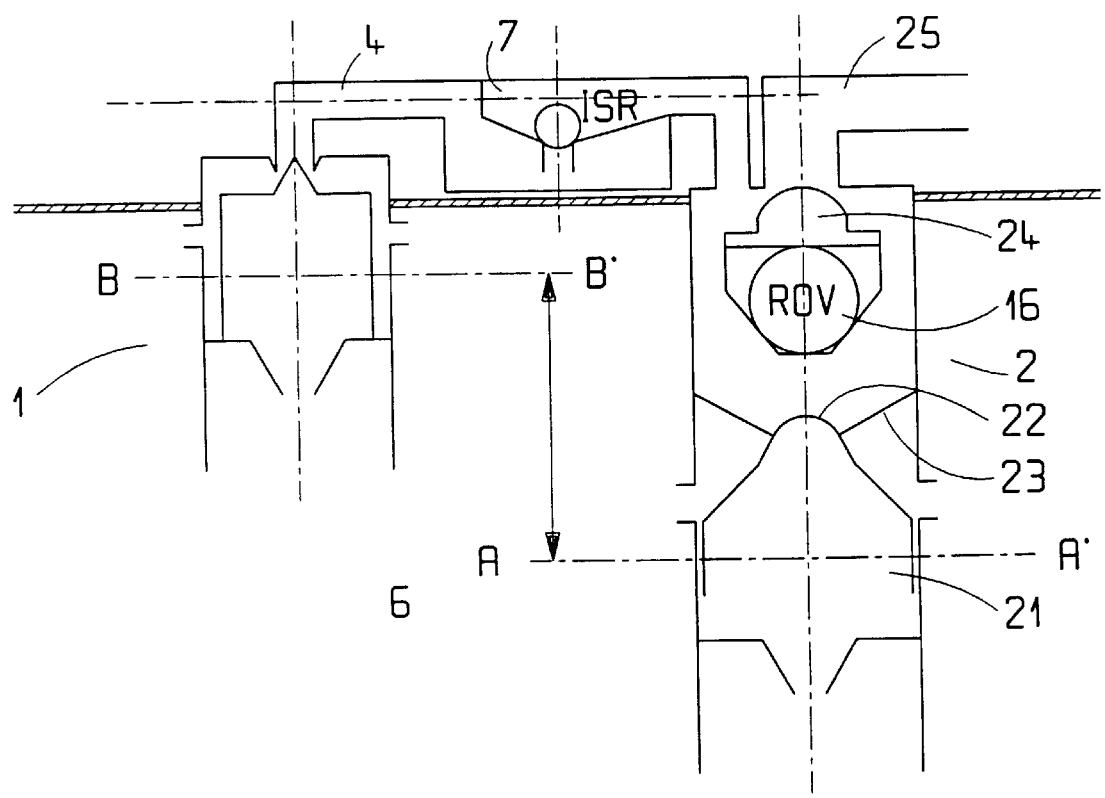
FIG. 6 is a diagrammatic elevational view, partially in cross section, of a further modification of the embodiment of FIG. 4.

FIGS. 4 to 6 show venting systems according to the second embodiment, whereby an ISR device 7 is located at a point on the venting pipe 4 connecting the float valve 1 to the capacity 2. A second float valve 21 surmounted by a needle 22 is mounted below the capacity 2 and makes it possible to shut off the bottom 23 of the latter.

This embodiment is particularly suitable for petrol tanks with which motor vehicles are equipped. In fact, due to the position of the ISR device 7 upstream of the capacity 2, the engine can be supplied with fuel as soon as the petrol level in the tank has fallen below the level which triggers the closing of the second float valve 21, below a pressure which virtually does not exceed the atmospheric pressure prevailing outside the tank, thus at once eliminating the difficulties associated with excess pressures in tanks when vehicles are at a standstill, with the engine idling.

In FIG. 4, the ROV function is ensured by the presence of two high-density ball ROV devices located respectively below the main float valve 1 and below the second float valve 21 located below the capacity 2. In these two devices, the balls of high-density material 16 have the function of pushing the float surmounting them upwards as soon as the tank 6 begins to overturn.

In FIG. 5, this ROV function is ensured, here, merely by a single ROV device 24 located downstream of the capacity 2 in the pipe 25 leading to the canister (not illustrated).

FIG. 6 illustrates a venting system similar to that of FIG. 5, in which, however, the single ROV device 24 has been integrated into the upper part of the volume of the capacity 2.

The presence of the valve 21 in the systems illustrated in FIGS. 4 to 6 also makes it possible to perform a particularly useful additional function, namely to determine the useful volume of the tank corresponding to the automatic triggering of the nozzle of the filling pump, as is found in service stations. In fact, at the end of the operation of filling the tank with fuel by means of such a nozzle, as soon as the fuel level reaches the level marked AA' in FIGS. 4 to 6, the valve 21 closes and limits the vapour outlet flow to that still taking place via the main valve 1 and allows a rise in pressure in the tank and the accumulation of fuel in the filler neck, so as to cause the triggering of the nozzle and to interrupt the introduction of fuel.

What is claimed is:

1. System for the venting of a liquid tank, said system comprising, on the one hand, a float valve arranged in the tank, in communication with a venting pipe which forms one end of a venting circuit, and, on the other hand, a closed volume internal to the tank, said closed volume including an emptying device, and defining a capacity for collecting and retaining any possible entrainments of liquid coming from the tank, said emptying device being separate from said float valve and the float valve being located outside the volume defining the capacity and including an upper orifice connected to the venting pipe at one end thereof such that the upper orifice is connected to the capacity by means of the venting pipe.

2. Venting system according to claim 1 comprising an overfilling prevention device housed in an upper part of the capacity.

3. Venting system according to claim 1 wherein the float valve is disposed above a high-density ball device resting in a perforated well and causing closing of the valve in response to overturning of the tank.

4. Venting system according to claim 1 wherein the capacity comprises, in an upper part, an arrangement for closing of a valve of the capacity in response to overturning of the tank, said arrangement comprising a cage which has a perforated well and in which rests a high-density ball, said ball, when displaced, pushing upwardly the valve of the capacity for shutting off an outlet pipe.

5. Venting system according to claim 1 for venting a fuel tank in a motor vehicle.

* * * * *